United States Patent
Labrecque et al.

(10) Patent No.: US 10,802,451 B2
(45) Date of Patent: Oct. 13, 2020

(54) SYSTEMS AND METHODS FOR WIRELESS COMMUNICATIONS BETWEEN COMPONENTS OF A MATERIAL PROCESSING SYSTEM

(71) Applicant: Hypertherm, Inc., Hanover, NH (US)

(72) Inventors: Dana Labrecque, Plainfield, NH (US); Christopher S. Passage, Sunapee, NH (US)

(73) Assignee: Hypertherm, Inc., Hanover, NH (US)

( * ) Notice: Subject to any disclaimer, the term of this patent is extended or adjusted under 35 U.S.C. 154(b) by 530 days.

(21) Appl. No.: 15/499,663

(22) Filed: Apr. 27, 2017

(65) Prior Publication Data

US 2017/0315524 A1 Nov. 2, 2017

Related U.S. Application Data

(60) Provisional application No. 62/328,515, filed on Apr. 27, 2016.

(51) Int. Cl.
| | | |
|---|---|---|
| *B23K 10/00* | (2006.01) | |
| *G05B 19/042* | (2006.01) | |
| *H04W 4/00* | (2018.01) | |
| *H04L 12/24* | (2006.01) | |
| *H04L 29/08* | (2006.01) | |

(52) U.S. Cl.
CPC ........ *G05B 19/042* (2013.01); *H04L 41/0806* (2013.01); *H04L 67/02* (2013.01); *H04W 4/00* (2013.01); *G05B 2219/23297* (2013.01); *G05B 2219/45044* (2013.01)

(58) Field of Classification Search
CPC ........ G05B 19/042; G05B 2219/23297; G05B 2219/45044; H04L 41/0806; H04L 67/02; H04W 4/00; H05H 1/26; H05H 1/36
USPC ............. 219/121.39, 121.54, 121.57, 121.45
See application file for complete search history.

(56) References Cited

U.S. PATENT DOCUMENTS

| | | | |
|---|---|---|---|
| 6,624,388 B1 * | 9/2003 | Blankenship ........ | B23K 9/1062 219/130.5 |
| 8,890,021 B2 * | 11/2014 | Shipulski ............... | B23K 10/02 219/121.39 |
| 10,046,521 B2 * | 8/2018 | Walker .................. | H04L 67/125 |

(Continued)

*Primary Examiner* — Mark H Paschall
(74) *Attorney, Agent, or Firm* — Proskauer Rose LLP (57) ABSTRACT

A material processing system includes a power supply in electrical communication with a cutting head. The power supply includes a control processor and a wireless communications control circuit configured to establish a web server for wirelessly communicating with a client device via a first communications interface. The wireless communications control circuit is configured to receive a request from the client device for a first web resource. The wireless communications control circuit is configured to request, via a second communications interface, a set of material processing system parameters from the control processor. The set of material processing system parameters is based on content of the request. The wireless communications control circuit is configured to serve, via the web server over the first communications interface, the first web resource to the client device. The first web resource includes web page formatting information and the set of material processing system parameters.

9 Claims, 4 Drawing Sheets

(56) References Cited

U.S. PATENT DOCUMENTS

| | | | |
|---|---|---|---|
| 2005/0021860 A1* | 1/2005 | Kelly | H04L 12/4625 709/246 |
| 2014/0046477 A1 | 2/2014 | Brahan et al. | |
| 2014/0240125 A1 | 8/2014 | Burch et al. | |
| 2015/0105898 A1 | 4/2015 | Adams et al. | |

* cited by examiner

```
┌─────────────────────────────────────────────────────────────────────┐
│ 305 establish a web server for communicating with the client device │
│ via a first communications interface                                │
└─────────────────────────────────────────────────────────────────────┘
                                  ↓
┌─────────────────────────────────────────────────────────────────────┐
│ 310 receive, via a second communications interface, one or more     │
│ commands from a control processor, the one or more commands         │
│ operative to configure the wireless communications control circuit  │
│ to operate as a web server                                          │
└─────────────────────────────────────────────────────────────────────┘
                                  ↓
┌─────────────────────────────────────────────────────────────────────┐
│ 315 receive, via the first communications interface, a request from │
│ the client device for a first web resource                          │
└─────────────────────────────────────────────────────────────────────┘
                                  ↓
┌─────────────────────────────────────────────────────────────────────┐
│ 320 request, via the second communications interface, a set of      │
│ material processing system parameters from the control processor,   │
│ the set of material processing system parameters based on content   │
│ of the request for a first web resource                             │
└─────────────────────────────────────────────────────────────────────┘
                                  ↓
┌─────────────────────────────────────────────────────────────────────┐
│ 325 serve, via the first communications interface, the first web    │
│ resource to the client device, the first web resource comprising    │
│ web page formatting information and the set of material processing  │
│ system parameters                                                   │
└─────────────────────────────────────────────────────────────────────┘
                                  ↓
┌─────────────────────────────────────────────────────────────────────┐
│ 330 receive, via the first communications interface, a second       │
│ request from the client device, the second request                  │
└─────────────────────────────────────────────────────────────────────┘
                                  ↓
┌─────────────────────────────────────────────────────────────────────┐
│ 335 extract a set of material processing system control parameters  │
│ from the second request, the set of material processing system      │
│ control parameters being transmitted to the control processor via   │
│ the second communications interface for modifying a mode of         │
│ operation of the material processing system                         │
└─────────────────────────────────────────────────────────────────────┘
```

SYSTEMS AND METHODS FOR WIRELESS COMMUNICATIONS BETWEEN COMPONENTS OF A MATERIAL PROCESSING SYSTEM

CROSS REFERENCE TO RELATED APPLICATIONS

This application claims the benefit of and priority under 35 U.S.C. § 119(e) to U.S. Provisional Patent Application No. 62/328,515, filed Apr. 27, 2016, which is incorporated by reference herein in its entirety.

TECHNICAL FIELD

This application relates generally to material processing systems. In particular, this application relates to systems and methods for providing wireless communications between a client device and a material processing system.

BACKGROUND

Material processing systems (e.g., plasma arc cutting systems, laser cutting systems, waterjet cutting systems, etc.) can be used for various material processing operations (e.g., cutting, marking, and gouging of a workpiece). A material processing operation can require a material processing system to be programmed with a number of control parameters (e.g., current settings, gas settings, motion controls, gas mixtures, cut speeds, etc.). The material processing system is typically programmed with these parameters via a computer numerical control (CNC) system or computer terminal that is hard-wired to a processor of the material processing system using a proprietary connection scheme and a communications protocol (e.g., RS-422) that is not supported on most client devices used to access a material processing system.

Further, a material processing system generates data sets related to system use and performance during operation. These data sets can be analyzed to provide valuable metrics for maintenance personnel, management, and system operators. However, these data sets must be obtained via the same cumbersome local interface used for providing the control parameters, and therefore, user access to this useful data can be hindered.

SUMMARY

Accordingly, there is a need for improved systems and methods for communications, and in particular wireless communications, between a client device and a material processing system.

In one aspect, a material processing system is featured including a cutting head and a power supply connected to the cutting head. The power supply includes a control processor configured to control operation of the power supply and a wireless communications control circuit connected to the control processor. The wireless communications control circuit is configured to host a web server for processing requests from a client device in wireless communication with the wireless communications control circuit.

In another aspect, a material processing system is featured including a power supply in electrical communication with a cutting head. The power supply includes a control processor and a wireless communications control circuit. The wireless communications control circuit is configured to establish a web server for communicating with a client device that is in wireless communication with the wireless communications control circuit via a first communications interface. The wireless communications control circuit is configured to receive, via the first communications interface, a request from the client device for a first web resource. The wireless communications control circuit is configured to request, via a second communications interface, a set of material processing system parameters from the control processor. The set of material processing system parameters is based on content of the request for a first web resource. The wireless communications control circuit is configured to serve, via the web server over the first communications interface, the first web resource to the client device. The first web resource includes web page formatting information and the set of material processing system parameters.

In another aspect, a method of wireless communication between a client device and a material processing system including a cutting head and a power supply comprising a control processor and a wireless communications control circuit is featured. The wireless communications control circuit establishes a web server for communicating with the client device via a first communications interface. The wireless communications control circuit receives, via the first communications interface, a request from the client device for a first web resource. The wireless communications control circuit requests, via a second communications interface, a set of material processing system parameters from the control processor, the set of material processing system parameters based on content of the request for a first web resource. The wireless communications control circuit serves, via the first communications interface, the first web resource to the client device. The first web resource includes web page formatting information and the set of material processing system parameters.

The above aspects can include one or more of the following features. In some embodiments, the material processing system further includes at least one sensor in communication with the control processor. The sensor provides a signal to the control processor indicative of a performance parameter of the power supply.

In some embodiments, the material processing system is a plasma arc cutting system and the cutting head is a torch. In some embodiments, the request for a first web resource is generated by a web browser executing on the client device.

In some embodiments, the wireless communications control circuit has an external antenna. In some embodiments, the antenna has a power gain of less than about 2.5 dBi.

In some embodiments, communications between the wireless communications control circuit and the client device are formatted in HTTP. In some embodiments, the power supply is free of physical network controls.

In some embodiments, the wireless communications control circuit is further configured to receive, via the second communications interface, one or more commands from the control processor. The one or more commands are operative to configure the wireless communications control circuit to operate as a web server. In some embodiments, system of claim 2 wherein the set of material processing system parameters comprises one or more of a current output setting for the power supply, a gas pressure setting, a gas type, gas mixture information, a cutting head motion setting, a cutting head speed setting, a current status of the material processing system, or an error history of the material processing system, diagnostic information based on operation of the material processing system, or parameters of a network connection.

In some embodiments, the wireless communications control circuit is further configured to receive, via the first communications interface, a second request from the client device, and extract a set of material processing system control parameters from the second request. The set of material processing system control parameters are transmitted to the control processor via the second communications interface for modifying a mode of operation of the material processing system.

In some embodiments, establishing the web server further comprises receiving, by the wireless communications control circuit, via the second communications interface, one or more commands from the control processor. The one or more commands are operative to configure the wireless communications control circuit to operate as a web server.

In some embodiments, the set of material processing system parameters includes one or more of a current output setting for the power supply, a gas pressure setting, a gas type, gas mixture information, a cutting head motion setting, a cutting head speed setting, a current status of the material processing system, or an error history of the material processing system, diagnostic information based on operation of the material processing system, or parameters of a network connection.

In some embodiments, the first communications interface is a wireless communications interface. In some embodiments, the second communications interface is a serial communications interface. In some embodiments, receiving a request from the client device for a first web resource further includes determining the client device and the wireless communications control circuit are connected to the same network.

Some embodiments further include receiving, by the wireless communications control circuit, via the first communications interface, a second request from the client device, and extracting, by the wireless communications control circuit, a set of material processing system control parameters from the second request, the set of material processing system control parameters being transmitted to the control processor via the second communications interface for modifying a mode of operation of the material processing system.

In some embodiments, the request for the first web resource is generated by a web browsing tool executing on the client device. In some embodiments, the second communications interface is an RS-232 interface and communications between the wireless communications control circuit and the control processor are formatted according to the RS-232 protocol.

BRIEF DESCRIPTION OF THE DRAWINGS

The advantages of the systems and methods described above, together with further advantages, may be better understood by referring to the following detailed description taken in conjunction with the accompanying drawings. The drawings are not necessarily to scale, emphasis instead generally being placed upon illustrating the principles of the described embodiments by way of example only.

DETAILED DESCRIPTION

The systems and methods described herein relate to a material processing system including a power supply with a wireless communications control circuit capable of communicating wirelessly with a client device according to various protocols. In this way, several different client device types can be used to communicate with the material processing system. Further, the wireless communications control circuit operates independently of the power supply's control processor, and therefore any processing overhead associated with communications is offloaded from the control processor, leading to more efficient material processing operations.

Figure 1:
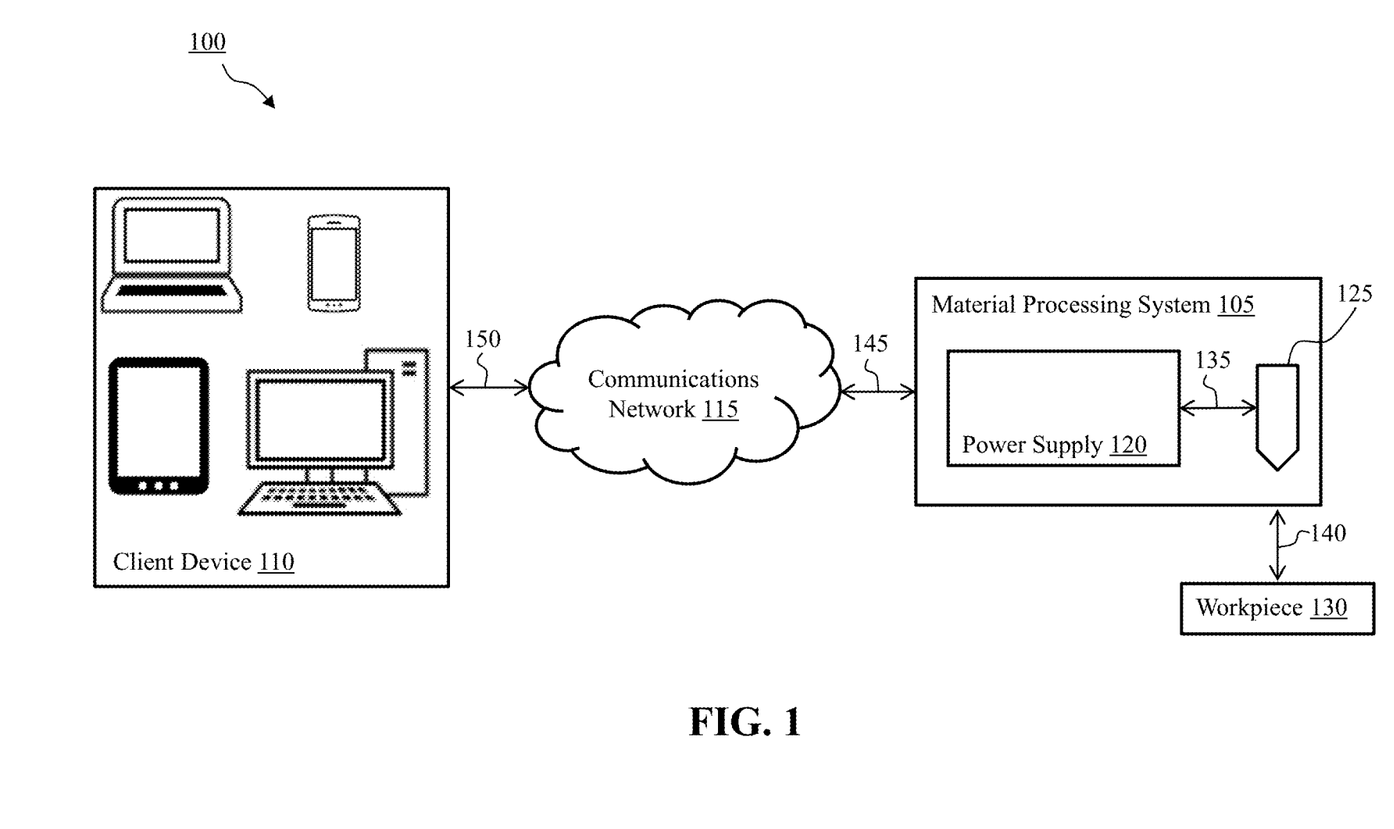
FIG. 1 is a block diagram of an exemplary material processing system and related components, in accordance with embodiments described herein.

FIG. 1 is a block diagram 100 of an exemplary material processing system 105 and related components in accordance with embodiments of the systems and methods described herein. Material processing system 105 is in communication with client device 110 via communications network 115. Communications network 115 can be a local network, such as a local area network ("LAN"), or a wide area network ("WAN"), such as the Internet and/or a cellular network. Communications network 115 may alternatively comprise components of both a LAN and a WAN, or any other type of network known in the art. Communications network 115 facilitates wireless communications between material processing system 105 and client device 110. For example, in some embodiments, network connection 145 is a wireless connection between material processing system 105 and an access point or router of communications network 115, and network connection 150 is a wired or wireless connection between client device 110 and the access point or router. In some embodiments, material processing system 105 is configured as an access point and client device 110 connects directly to material processing system 105 via a wireless connection.

Client device 110 can include, for example, a desktop computer and/or a mobile device (e.g., cellular phone, personal digital assistant (PDA) device, smart phone, tablet, laptop computer, electronic mail device, etc.).

Material processing system 105 includes power supply 120 in electrical communication with a cutting head 125 via connection 135. For example, connection 135 can be wires or bus bars for providing electrical current to cutting head 125 for performing material processing operations.

Material processing system 105 is in electrical communication with workpiece 130 via connection 140. In some embodiments, material processing system 105 is a plasma arc cutting system and connection 140 represents an arc used for processing (e.g., cutting, marking, gouging) workpiece 130, and a common electrical connection (e.g., electrical ground) between workpiece 130 and power supply 120. In some embodiments, material processing system 105 is a waterjet cutting system and connection 140 represents a waterjet used for processing workpiece 130. In some embodiments, material processing system 105 is a laser cutting system and connection 140 represents a beam used for processing workpiece 130.

Figure 2:
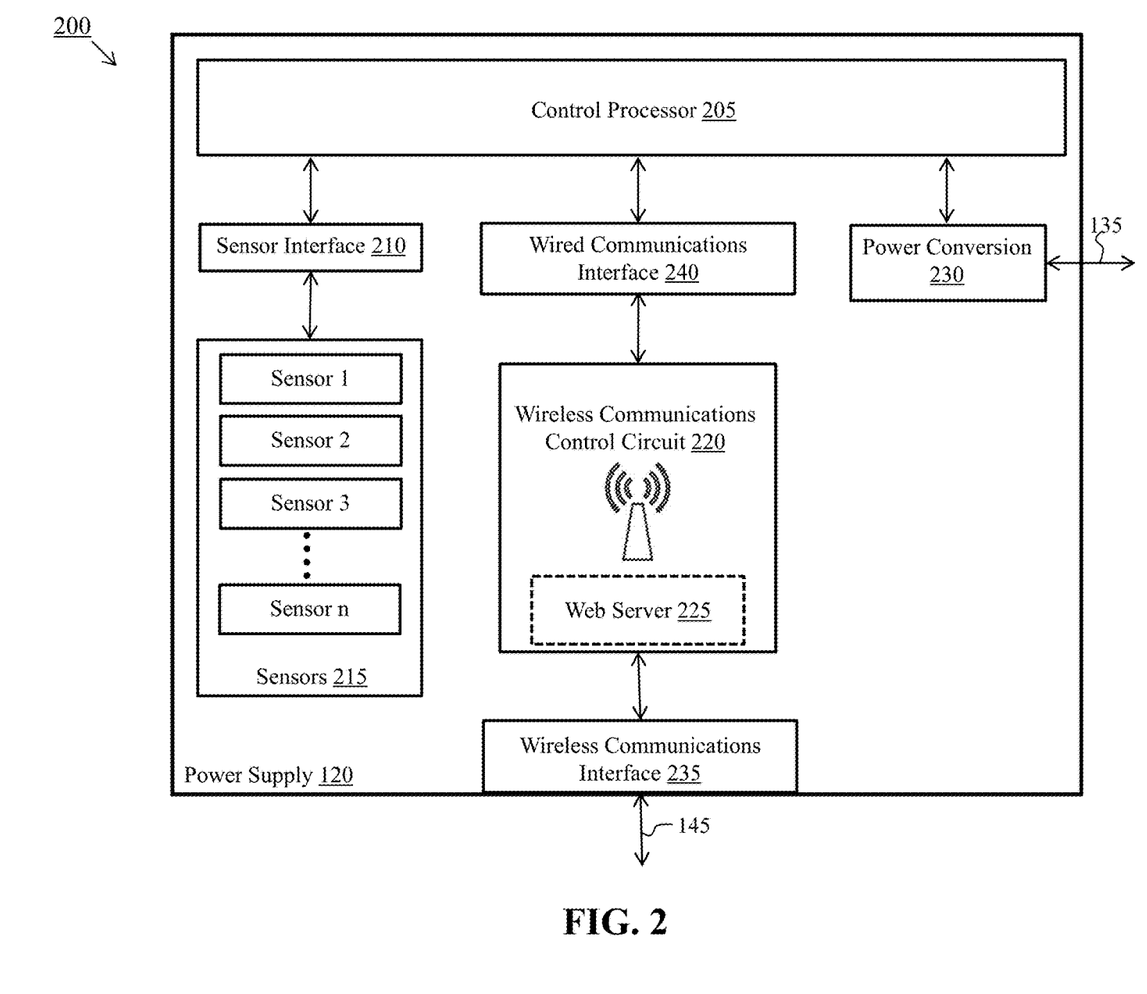
FIG. 2 is a block diagram of an exemplary power supply, in accordance with embodiments described herein.

FIG. 2 is a block diagram of a power supply 120, in accordance with embodiments described herein. Power supply 120 includes control processor 205 in communication with sensor interface 210 for accessing a variety of sensors 215. Control processor 205 generally includes a processor (e.g., microprocessor, microcontroller, DSP, field-programmable gate array ("FPGA"), complex programmable logic device ("CPLD"), etc.). In some embodiments, control processor 205 is an STM32 F4 High-Performance MCU from STMicroelectronics or similar processor. In some embodiments, control processor 205 includes volatile and non-volatile memory, and other logic for managing and interfacing with other components and peripherals of material processing system 105. Control processor 205 is programmed with computer software instructions enabling it to perform the computations and operations described herein in conjunction with the other components of material processing system 105. Sensor interface 210 includes circuitry (e.g., circuit board traces, wires, optical connections, interface logic, etc.) to facilitate access to sensors 215.

Sensors 215 can include a plurality of sensors for detecting and/or measuring properties of material processing system 105 and the operations it is used to perform, and in turn, providing corresponding output (e.g., electrical signal, optical signal). For example, sensors 215 can include sensors responsive to changes in temperature (e.g., thermistors, thermocouples) for determining the temperature at different components of material processing system 105. Sensors 215 can include sensors for measuring the rotational speed (e.g., tachometer) of one or more fans used to cool the components of material processing system 105.

Sensors 215 can further include one or more sensors responsive to changes in the flow of electrical current (e.g., current sensors) for measuring the current output from power supply 120. The current sensors can be any active or passive devices used for measuring or quantifying the flow of current. In some embodiments, the current sensor is a current sense, or "shunt" resistor mounted to a printed circuit board of power supply 120. In some embodiments, the current sensor is a Hall-effect current sensor device.

Sensors 215 can also include sensors responsive to a change in the flow of gas and/or liquid (e.g., flow meter) for measuring the flow rate of a gas or liquid to cutting head 125 during a material processing operation. Sensors 215 can further include sensors responsive to a change in linear acceleration (e.g., accelerometer) and angular velocity (e.g., gyroscope) for measuring the orientation of cutting head 125, power supply 120, or other components of material processing system 105. In some embodiments, the output from the sensors comprises signals or data corresponding to a single axis or a plurality of axes (e.g., 2-axis sensor, 3-axis sensor).

Control processor 205 is also in communication with at least one power conversion circuit 230 for providing current to cutting head 125 via connection 135, as discussed above. For example, in some embodiments, power conversion circuit 230 is a switching power circuit arranged in a chopper or buck converter configuration for converting a rectified DC input voltage to a stepped-down output voltage that is applied to cutting head 125 for material processing operations.

Control processor 205 is further in communication with wireless communications control circuit 220 via wired communications interface 240. In some embodiments, wired communications interface 240 is a wired parallel or serial communications interface between control processor 205 and wireless communications control circuit 220. In some embodiments, wired communications interface 240 is an RS-232 interface operating at about 115200 baud that is used by control processor 205 for sending commands (e.g., AT commands) to configure and request status from wireless communications control circuit 220, and for responding to asynchronous requests from wireless communications control circuit 220 as described in more detail below. For example, in some embodiments, control processor 205 sends commands over wired communications interface 240 to configure wireless communications control circuit 220 to host web server 225 for processing requests received from client device 110, as described in more detail below. In some embodiments, wireless communications control circuit 220 is a Gainspan GS2011 or similar wireless module.

Wireless communications control circuit 220 includes a connection to network connection 145 via wireless communications interface 235. In some embodiments, wireless communications interface 235 is a wireless communications interface that provides a wireless network connection between wireless communications control circuit 220 and client device 110 or other network device (e.g., access point, router). In some embodiments, wireless communications interface 235 includes an antenna in electrical communication with wireless communications control circuit 220. In some embodiments, the antenna has a power gain of between about 2 dBi and 2.5 dBi, and allows wireless communications control circuit 220 to communicate wirelessly with other network devices within a radius of about 200 feet in open air of a shop space or cutting environment.

In some embodiments, the components of power supply 120 are located on a printed circuit board mounted within a housing of power supply 120. In some embodiments, various sensors 215 and peripherals are located off of the printed circuit board, and are in communication with control processor 205 via flex circuits or wiring harnesses.

Figure 3:
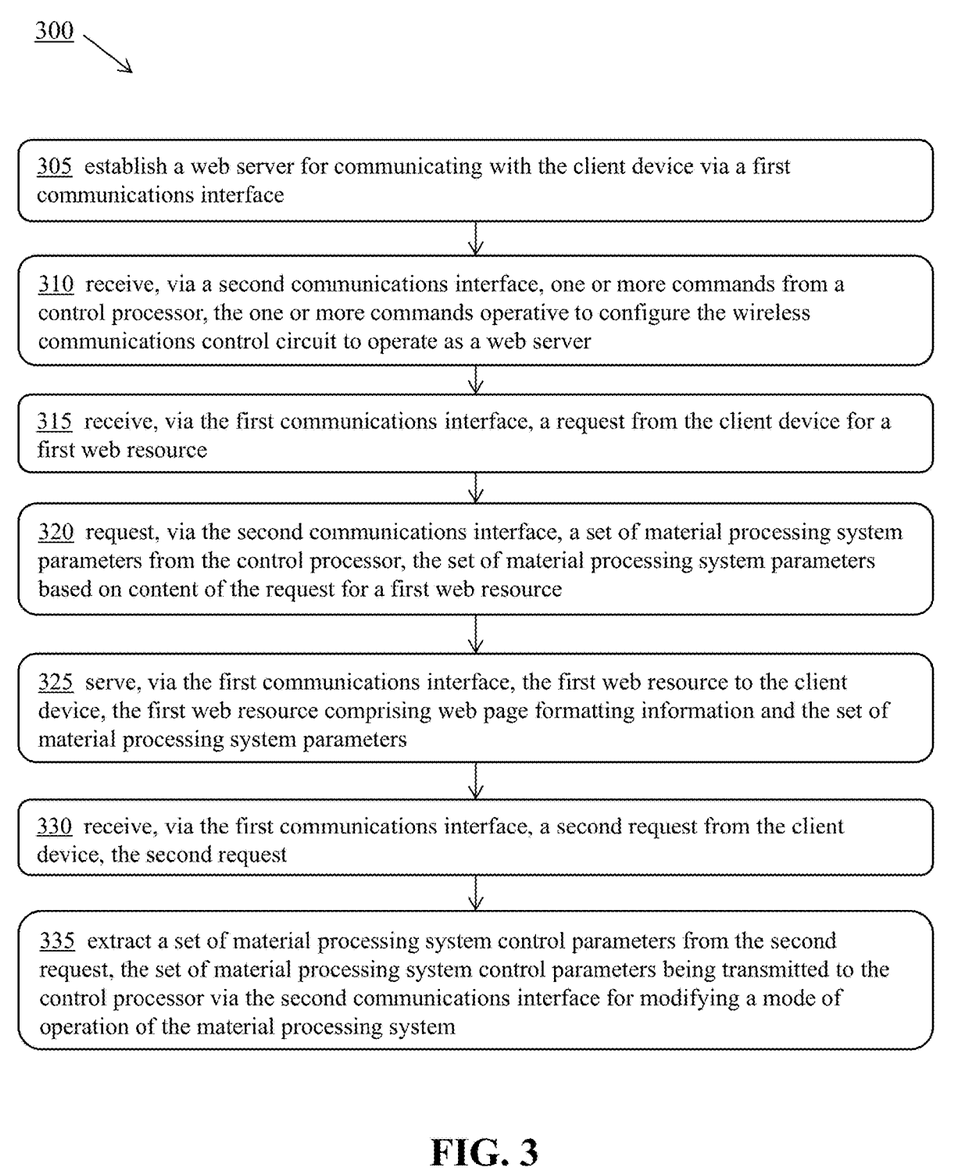
FIG. 3 is a flow diagram of a method for providing wireless communication between a client device and a material processing system, in accordance with embodiments described herein.

Additional features and components of the technology will be described in reference to FIG. 3, which shows a flow diagram for a method 300 of providing wireless communication between a client device and a material processing system. Wireless communications control circuit 220 establishes (305) web server 225 for communicating with client device 110 via a first communications interface (e.g., wireless communications interface 235). For example, wireless communications control circuit 220 receives (310), via a second communications interface (e.g., wired communications interface 240), one or more commands from control processor 205, the one or more commands operative to configure wireless communications control circuit 220 to operate as a web server 225. As described above, in some embodiments wired communications interface 240 is an RS-232 interface, and control processor 205 configures wireless communications control circuit 220 by sending one or more commands over the interface. In some embodiments, control processor 205 is configured to program wireless communications control circuit 220 upon initial power up of power supply 120, or in response to de-assertion of a reset condition.

Wireless communications control circuit 220 is accordingly configured to host web server 225 which can be set up to store and serve a webpage to client device 110. The webpage uses a responsive design that adjusts properly to different screen sizes (e.g., screen dimensions, resolution capabilities, etc.) of various client devices 110 to support a wide range of client devices 110. This configuration is advantageous because many different types of client devices 110 can connect and communicate with power supply 120 wirelessly via wireless communications control circuit 220 without requiring any additional software or 'apps' to be developed or purchased and loaded onto client device 110. The technology also improves the ease-of-use of material processing system 105, as interaction with webpages is a substantially ubiquitous skill among client device users. Accordingly, the technology described herein takes advantage of standard, "built-in" features of a various computing devices by enabling communications using the client device's web browser.

A further advantage to the technology is that power supply 120 can be designed such that it is free of physical network controls (e.g., knobs, buttons, displays, touch panels, etc.). This eliminates complexity from the power supply housing design by obviating components such as electrostatic discharge protection circuits, and circuits for managing electromagnetic and radio-frequency interference ("EMI" and "RFI") that are otherwise necessary when physical network controls are mounted in the power supply housing. The technology further eliminates components that can be the most failure-prone components of a power supply design due to their mechanical nature (e.g., wearing out of knob and switch contacts over time, failure of display elements, failure of EMI and RFI gaskets, etc.).

Figure 4:
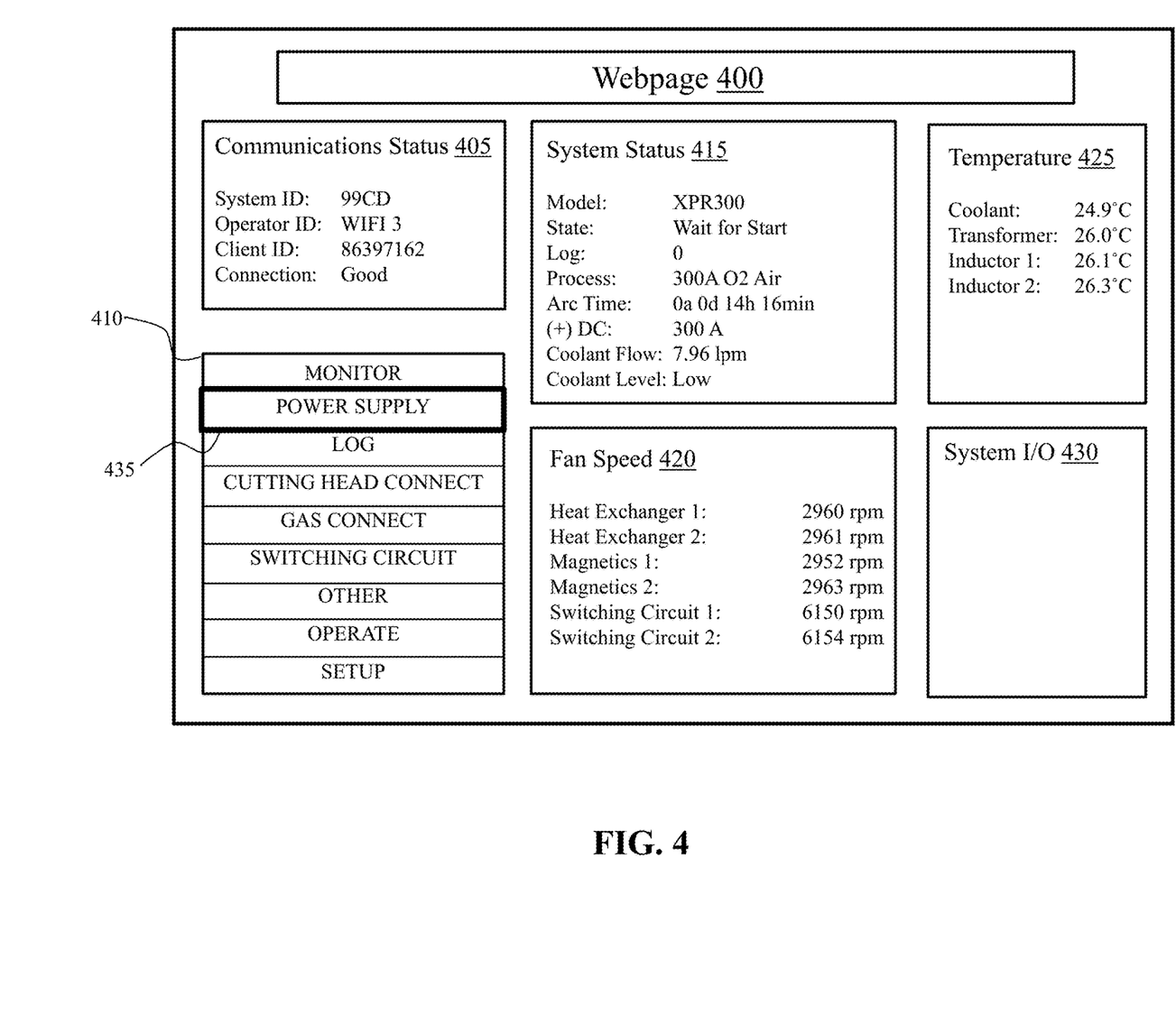
FIG. 4 shows an exemplary webpage, in accordance with embodiments described herein.

The webpage hosted by web server 225 serves as a user interface that is updateable and customizable for an end user, operator, company, and/or service provider using standard programming techniques. FIG. 4 shows an exemplary webpage 400 in accordance with embodiments described herein. The information shown on webpage 400 can be obtained by control processor 205 based on signals received from sensors 215. The information shown on webpage 400 can also be based on the configurations of control processor 205 and wireless communications control circuit 220.

Webpage 400 includes communications status 405 which displays information about the connection between wireless communications control circuit 220 and the client device 110 on which the webpage is being displayed. Webpage 400 includes subpage selection 410 which is used to select one of several possible webpages to display, each webpage including information about various components of material processing system 105. In some embodiments, the currently-selected webpage 400 is indicated by a highlighted or bolded indicator 435 surrounding the selection. Webpage 400 also includes system status 415 which provides static information about power supply 120 such as its model number, and also provides real-time status information, for example, the current operational state, the number of arc hours the power supply has been operated for (in the case of a plasma arc cutting system), and the current coolant level. Webpage 400 further includes fan speed 420 which displays the rotational speed of one or more fans within material processing system 105, and temperature 425 which displays the temperature at one or more components of material processing system 105. Webpage 400 can also include system I/O 430 which displays the status of various I/O of control processor 205 and wireless communications control circuit 220. In some embodiments, the state of various I/O can be set via selections made on webpage 400.

Returning to FIG. 3, wireless communications control circuit 220 receives (315), via the first communications interface (e.g., wireless communications interface 235), a request from client device 110 for a first web resource. For example, client device 110 can send a hypertext transfer protocol ("HTTP") request for webpage content wirelessly via wireless communications interface 235 to web server 225 operating on wireless communications control circuit 220. In some embodiments, the request is sent in one or more messages. In some embodiments, the data of the request is packaged according to a protocol that uses JSON for formatting the messages.

Wireless communications control circuit 220 requests (320), via the second communications interface (e.g., wired communications interface 240), a set of material processing system parameters from control processor 205, the set of material processing system parameters based on content of the request for a first web resource. For example, the request is processed by wireless communications control circuit 220 and packaged into one or more messages in a format compatible with wired communications interface 240 and the messages are transmitted to control processor 205 for further processing of the request. The webpage content requested by client device 110 can be data comprising some or all of the information shown in webpage 400. Control processor 205 obtains the requested information based on its configuration information and measurements from various sensors 215, and provides the data to wireless communications control circuit 220 via messages transmitted over wired communications interface 240.

Wireless communications control circuit 220 serves (325), via the first communications interface (e.g., wireless communications interface 235), the first web resource to client device 110, the first web resource comprising web page formatting information and the set of material processing system parameters. For example, wireless communications control circuit 220 responds to the request from client device 110 with one or more wirelessly-transmitted messages including the webpage information comprising system parameters of material processing system 105 as discussed above.

In some embodiments, wireless communications control circuit 220 supports an HTTP API that allows users who do not wish to use the standard/OEM webpage provided by webserver 225 to create a custom webpage interface tailored to their wants, needs, and/or stylistic preferences. For example, in this configuration, client device 110 sends HTTP commands to wireless communications control circuit 220 and then creates its own webpage based on the data received in response. The HTTP API can be used for all communications to and from the webpage as well. In some embodiments, the HTTP API is used to pass information from material processing system 105 to a CNC system that is controlling material processing system 105. In this embodiment, webserver 225 handles delivering information and the webpage is resident on the system (e.g., on wireless communications control circuit 220), and the user can configure the API to receive both the webpage and the data, or just the data. The API also allows the user to choose its own logos and other features and stylistic points for its custom webpage.

In some embodiments, the HTTP API is capable of not only receiving data about components of material processing system 105, but is also able to program parameters of a material processing operation on the system, as well as cause the system to enter test modes (e.g., test preflow and test cutflow). Wireless communications control circuit 220 receives (330), via the first communications interface (e.g., wireless communications interface 235), a second request from client device 110. The second request can include a set of material processing system control parameters (e.g., current settings, gas settings, motion controls, gas mixtures, cut speeds, etc.) for a material processing operation to be performed by material processing system 105.

Wireless communications control circuit 220 extracts (335) the set of material processing system control parameters from the second request, the set of material processing system control parameters being transmitted to control processor 205 via the second communications interface (e.g., wired communications interface 240) for modifying a mode of operation of material processing system 105.

In some embodiments, the technology described herein provides a method called OTAFU (over the air firmware update) which enables the firmware on wireless communications control circuit 220 and the webpage stored thereon to be updated via HTTP requests received over wireless communications interface 235. Accordingly, this feature advantageously enables reconfiguration and updating of wireless communications control circuit 220 remotely without requiring physical intervention by field technicians.

In some embodiments, wireless communications control circuit 220 can be set up in two modes. In the first mode (e.g., limited access point mode), wireless communications control circuit 220 acts as its own access point and hosts a wireless network that one or more client devices 110 can connect to. In the second mode (e.g., client mode), wireless communications control circuit 220 first connects to a nearby access point and as a security feature, only client devices 110 that are connected to the same access point are able to access wireless communications control circuit 220. For example, wireless communications control circuit 220 can analyze the internet protocol ("IP") address and other information included with the request from client device 110, and only process the request if it is determined that client device 110 is connected to the same access point as wireless communications control circuit 220.

In some embodiments, wireless communications control circuit 220 is configured to utilize a name resolution service called multicast Domain Name System ("mDNS") that enables client device 110 to access the webpage hosted by web server 225 using a URL which does not require the exact IP address of wireless communications control circuit 220. For example, the webpage on webserver 225 can be accessed using one or more of a descriptor, name, or customizable identifier (e.g., Front Right Machine, First Floor Cutter, etc.). This is advantageous over current web-based system add-on modules which require the user to know the exact IP address of the device before then accessing it using a URL which includes the IP address. In essence, the configuration of the technology herein obviates the need to query a router or access point prior to be able to access the web server based on the technology's ability to name the network-connected components of the system.

In some embodiments, wireless communications control circuit 220 communicates via the internet to data storage servers such as Amazon® and Thingworx® for continuously sending data to the servers for maintaining a history of system usage data over time. This advantageously provides real time updates on system usage which are in turn applied to tasks such as system utilization analysis, consumable component reorder, demand forecasts, and others.

Although the configuration and operation of the components of material processing system 105 has been described with respect to a particular embodiment, it should be appreciated that other topologies and configurations can be implemented without departing from the spirit of the technology described herein.

Comprise, include, and/or plural forms of each are open ended and include the listed parts and can include additional parts that are not listed. And/or is open ended and includes one or more of the listed parts and combinations of the listed parts.

One skilled in the art will realize the subject matter may be embodied in other specific forms without departing from the spirit or essential characteristics thereof. The foregoing embodiments are therefore to be considered in all respects illustrative rather than limiting of the subject matter described herein.

What is claimed is:

1. A material processing system comprising:
a cutting head; and
a power supply connected to the cutting head, the power supply including:
a control processor configured to control operation of the power supply;
a wired communications interface configured to receive one or more commands from the control processor and to communicate the one or more commands to a wireless communications control circuit;
a wireless communications control circuit connected to the control processor through the wired communications interface, the wireless communications control circuit receives one or more commands from the control processor to operate as a web server to process requests from a client device; and
a wireless communications interface configured to provide a wireless network connection between the wireless communications control circuit and a client device.

2. A material processing system comprising:
a power supply in electrical communication with a cutting head, the power supply comprising a control processor and a wireless communications control circuit configured to:
establish a web server by receiving one or more commands from the control processor, the one or more commands operative to configure the wireless communication control circuit to operate as the web server, the web server for communicating with a client device, the client device in wireless communication with the wireless communications control circuit via a first communications interface;
receive, via the first communications interface, a request from the client device for a first web resource;
request, via a second communications interface, a set of material processing system parameters from the control processor, the set of material processing system parameters based on content of the request for a first web resource; and
serve, via the web server over the first communications interface, the first web resource to the client device, the first web resource comprising web page formatting information and the set of material processing system parameters;
receive via the first communications interface, a second request from the client device; and
extract via the wireless communications control circuit a set of material processing system control parameters from the second request, the set of material processing system parameters including at least one of a current output setting for the power supply, a gas pressure setting, a gas type, gas mixture information, a cutting head motion setting, a cutting head speed setting, a current status of the material processing system, or an error history of the material processing system, diagnostic information based on operation of the material processing system, or parameters of a network connection, the set of material processing system control parameters being transmitted to the control processor via the second communications interface for modifying a mode of operation of the material processing system.

3. The material processing system of claim 2 further comprising at least one sensor in communication with the control processor, the sensor providing a signal to the control processor indicative of a performance parameter of the power supply.

4. The material processing system of claim 2 wherein the material processing system is a plasma arc cutting system and the cutting head is a torch.

5. The material processing system of claim 2 wherein the request for a first web resource is generated by a web browser executing on the client device.

6. The material processing system of claim 2 wherein the wireless communications control circuit has an external antenna.

7. The material processing system of claim 6 wherein the antenna has a power gain of less than about 2.5 dBi.

8. The material processing system of claim 2 wherein communications between the wireless communications control circuit and the client device are formatted in HTTP.

9. The material processing system of claim 2 wherein the power supply is free of physical mechanical controls.

* * * * *